(12) United States Patent
Pento et al.

(10) Patent No.: US 7,818,266 B2
(45) Date of Patent: Oct. 19, 2010

(54) METHOD AND SYSTEM FOR PROVIDING ELECTRONIC CUSTOMS FORM

(75) Inventors: Louie F. Pento, Staten Island, NY (US); Daniel S. Stirewalt, Brooklyn, NY (US)

(73) Assignee: United States Postal Service, Washington, DC (US)

( * ) Notice: Subject to any disclaimer, the term of this patent is extended or adjusted under 35 U.S.C. 154(b) by 1186 days.

(21) Appl. No.: 10/953,357

(22) Filed: Sep. 30, 2004

(65) Prior Publication Data

US 2005/0251404 A1    Nov. 10, 2005

Related U.S. Application Data

(60) Provisional application No. 60/549,566, filed on Mar. 4, 2004.

(51) Int. Cl.
*G06Q 30/00* (2006.01)
(52) U.S. Cl. ...................................................... 705/331
(58) Field of Classification Search .............. 340/572.1; 709/224
See application file for complete search history.

(56) References Cited

U.S. PATENT DOCUMENTS

| | | | |
|---|---|---|---|
| 6,040,920 A | 3/2000 | Ichiriki | |
| 6,192,165 B1* | 2/2001 | Irons | 382/306 |
| 6,209,788 B1* | 4/2001 | Bridgelall et al. | 235/462.32 |
| 6,526,443 B1* | 2/2003 | Goldsmith et al. | 709/224 |
| 7,415,613 B2* | 8/2008 | Impson et al. | 713/176 |
| 2002/0065677 A1 | 5/2002 | Grainger et al. | |
| 2003/0023522 A1* | 1/2003 | Dutta et al. | 705/31 |
| 2003/0033210 A1* | 2/2003 | Ma et al. | 705/26 |
| 2003/0093389 A1 | 5/2003 | Critelli et al. | |
| 2003/0195815 A1 | 10/2003 | Li et al. | |
| 2003/0236680 A1 | 12/2003 | Holoubek | |
| 2004/0090642 A1* | 5/2004 | Hikita | 358/1.11 |
| 2004/0133528 A1* | 7/2004 | Furka | 705/401 |
| 2004/0193435 A1* | 9/2004 | Fang | 705/1 |
| 2005/0119786 A1* | 6/2005 | Kadaba | 700/224 |

(Continued)

OTHER PUBLICATIONS

"The cost of inspections", Mongelluzzo, Bill, Journal of Commerce, Jul. 14, 2003.*

*Primary Examiner*—Rob Wu
(74) *Attorney, Agent, or Firm*—Finnegan, Henderson, Farabow, Garrett & Dunner, LLP (57) ABSTRACT

Methods and systems are provided for creating and processing an electronic customs declaration manifest. These methods and systems include creating a image of the customs declaration form, converting the image of the customs declaration form into an electronic customs manifest, and transferring the electronic customs manifest to a database. In addition, a image is may also be forwarded electronically to a remote encoding center, where the customs declaration form data is manually converted into an electronic file for storing in a database. Customs services of both the originating and destination countries review the declared information stored in the database. When the international mailpiece arrives at the border, domestic customs service may find a matching unique identifiers on the international mailpieces and customs declaration forms stored in the database. The service provider may load an international mailpiece into an airplane, if a domestic customs service allow the international mailpiece having a matching unique identifier to leave the originating country. A service provider may return an international mailpiece to the domestic customs service if an international mailpiece is not allowed to leave the originating country.

28 Claims, 4 Drawing Sheets

U.S. PATENT DOCUMENTS

| | | |
|---|---|---|
| 2005/0128304 A1* | 6/2005 | Manasseh et al. ...... 348/207.99 |
| 2005/0149453 A1* | 7/2005 | Amling et al. ................ 705/60 |
| 2005/0187874 A1* | 8/2005 | Sanal .......................... 705/40 |
| 2007/0008135 A1* | 1/2007 | Sajkowsky ............... 340/572.1 |
| 2008/0156704 A1* | 7/2008 | Koren et al. ................ 209/552 |
| 2009/0101826 A1* | 4/2009 | Frank ...................... 250/360.1 |
| 2009/0146832 A1* | 6/2009 | Ebert et al. ............ 340/825.49 |

* cited by examiner

METHOD AND SYSTEM FOR PROVIDING ELECTRONIC CUSTOMS FORM

This application claims priority to U.S. Provisional Application No. 60/549,566, filed on Mar. 4, 2004, the contents of which are hereby incorporated by reference into this application as if set forth herein in full.

TECHNICAL FIELD

This invention relates generally to providing customs declaration forms in an electronic format.

BACKGROUND

Millions of consumers mail letters, packages, and other mailpieces worldwide daily. An international mailpiece generally may not leave the sending country until the appropriate customs service reviews the customs declaration form itemizing the mailpiece's contents and its declared value. Similarly, an international mailpiece may not enter the destination country until the customs declaration form is reviewed by the customs service in that country. Today, to send a mailpiece internationally, depending on the type of international mailpiece and the declared value of its contents, the sender must fill out one of the available paper customs declaration forms. That paper form, affixed to the mailpiece, must then be reviewed by the customs services of the sending and destination countries.

Each time a mailpiece crosses a country's border, the customs service of that country may screen its contents. The customs service may perform that screening by opening and visually inspecting the contents of the mailpiece. More often, however, the customs service simply reviews the disclosure form, such as the customs declaration form, prepared by the sender of the international mailpiece. Typically, the customs declaration form lists all the items enclosed in the mailpiece and their declared value.

Currently, most customs declaration forms designed for consumer use are in paper form. Once a consumer fills out a customs declaration form, one copy may be stored by the service provider in archives and another copy may be stored by the customs service of the country from which the mailpiece is sent. A third copy, typically attached to the international mailpiece itself, may need to be examined twice. The first time, the customs declaration form may be examined prior to the international mailpiece leaving the sending country by its customs service. The customs declaration form may also be examined a second time prior to delivery of the international mailpiece by the customs service of the destination country.

The review of a paper-based customs declaration form by two customs services significantly increases the delivery time of international mailpieces. As is well known in the art, delivery of an international mailpiece may take up to six weeks. For example, an international mailpiece mailed via airmail service or economy mail service offered by a service provider, such as the United States Postal Service (USPS), may be in transit for four to six weeks.

In addition, because of the significant volume of international mail, customs services may need to review millions of customs declaration forms on a daily basis. And, to review customs declaration forms, customs service personnel may need to travel to the shipping and receiving sites of service providers where international mailpieces arrive for further routing. The review process may be further slowed due to the need for customs service personnel to handle each international mailpiece individually.

It is therefore desirable to provide methods and systems for creating and maintaining customs declaration forms in an electronic format enabling paperless and expedient forwarding, review, search, and storage via digital means, such as with a computer-based network.

SUMMARY OF THE INVENTION

Consistent with the invention, methods and systems are provided that include creating an image of the customs declaration form, converting the image of the customs declaration form into an electronic customs manifest, transferring the electronic customs manifest to a database, forwarding a paper copy of the customs declaration form to storage, and scanning a unique identifier on the customs declaration form attached to the international mailpiece. Additionally, these methods and systems include finding a match between the unique identifier on the customs declaration form attached to the international mailpiece and the unique identifier of one of the electronic customs manifests stored in the database.

After the electronic customs manifest is reviewed, if the customs service allows the international mailpiece having the matching unique identifier to leave the originating country, the service provider may load the international mailpiece into an airplane. If that customs service does not allow the international mailpiece having the matching unique identifier to leave the originating country, the service provider will return the international mailpiece to the originating customs service for further inspection and processing.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

To enable mail processing equipment to process customs declaration forms together with other mailpieces processed by a service provider, a customs declaration form may be designed to have a shape of a standard letter. For example, a customs declaration form may have a width, height, and thickness conforming to the width, height, and thickness of typical letters that mail processing equipment processes. For example, a customs declaration form may be approximately 6 ⅛" high, 10 ½" wide and 0.2" thick. Other sizes may be used as appropriate.

Figure 1:
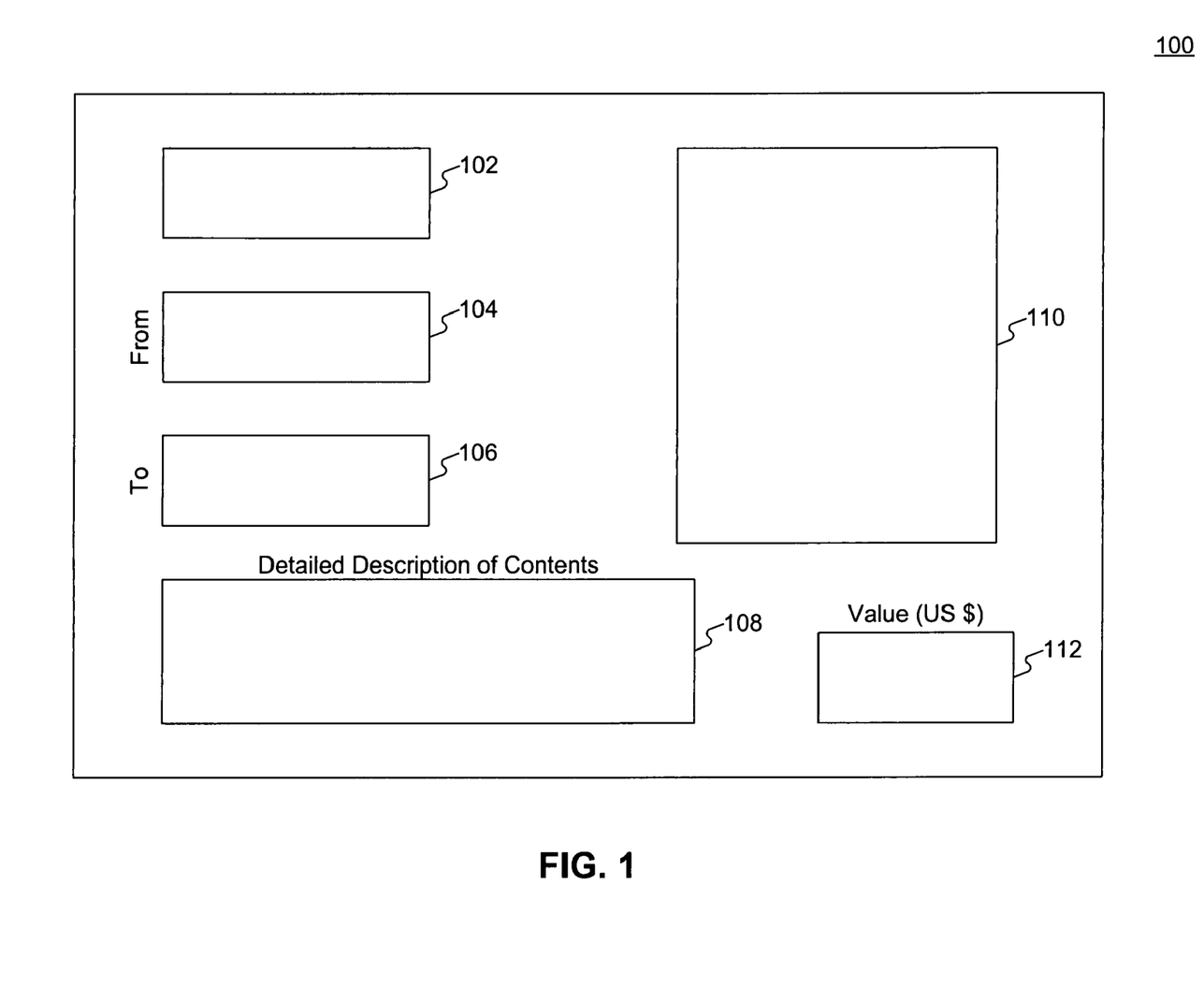
FIG. 1 is an exemplary customs declaration form, consistent with the invention.

As well known in the art, having customs declaration form information in paper form may significantly slow the speed of international shipping. To facilitate high-speed delivery of international mailpieces, a service provider may want to convert information captured in a customs declaration form into an electronic or digital format. FIG. 1 depicts an exemplary customs declaration form 100 designed to facilitate such conversion.

As shown in FIG. 1, customs declaration form 100 may have a unique identifier area 102. The location, type, and size of unique identifier area 102 within the face of customs declaration form 100 may be governed by international standards. As is well known in the art, the international standards dictating the location of a unique identifier on the customs declaration form may be the result of international negotiations between countries exchanging mail. Another requirement for location, type, and size of unique identifier area 102 may be dictated by the equipment used to take an image of customs declaration form 100 or scan unique identifier area 102, as described below.

A unique identifier may be any type of code capable of carrying data, such as, for example, a barcode. The unique identifier should preferably be easily scannable. For example, a barcode may be easily generated, printed and subsequently scanned by commercially available barcode scanner devices. Referring back to FIG. 1, unique identifier area 102 may carry information with several international mailpiece attributes. For example, unique identifier area 102 may include information providing the code of the originating country or information enabling mail processing equipment to recognize the mailpiece as a customs declaration form. For example, unique identifier area 102 may consist of barcode information with thirteen characters. The first two characters may be the letters "CP," identifying the mailpiece as a customs declaration form. The next nine characters may represent a unique sequential number designed to uniquely identify each customs declaration form. The last two characters may be the letters "U.S." identifying the United States, for example, as the country where the customs declaration form originated. As a person skilled in the art will recognize, unique identifier area 102 may contain data reflecting other attributes of the customs declaration form, consistent with the present invention.

As shown in FIG. 1, customs declaration form 100 may also list the international mailpiece sender's name and address in "From" box 104. In "To" box 106, customs declaration form 100 may also identify the name and address of the recipient. As is well known in the art, customs declaration form 100 may also include a detailed description of the contents of the international mailpiece in box 108, as well as the value of the contents in box 112. Finally, customs declaration form 100 may also list other information required by the service provider and customs service in another area, box 110. For example, box 110 may contain data related to the insurance of the contents of the international mailpiece or the sender's instructions in case the international mailpiece cannot be delivered due to an invalid delivery address.

Figure 2:
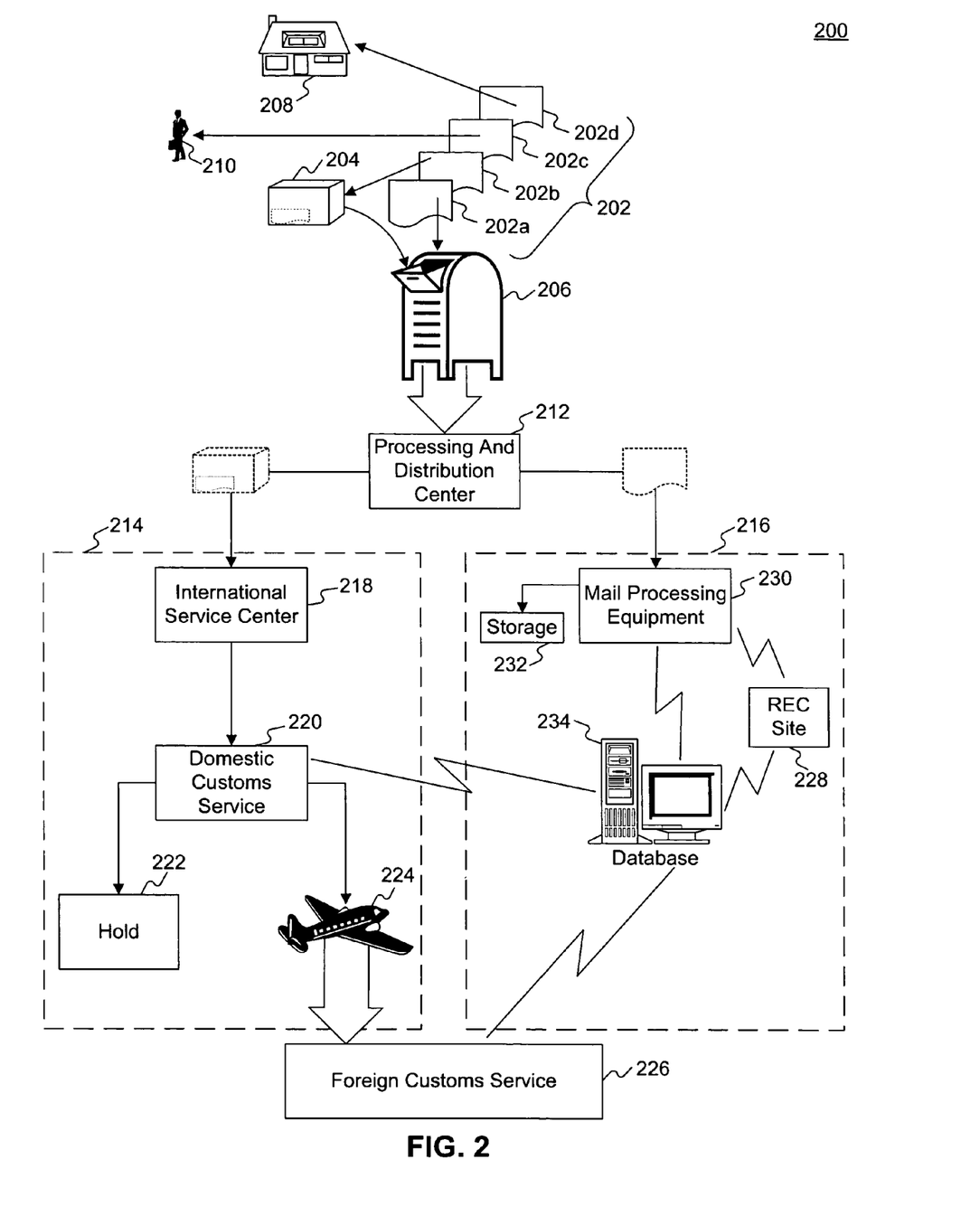
FIG. 2 is a diagram of an exemplary process for a high-speed delivery of an international mailpiece, consistent with the invention.

FIG. 2 is an exemplary process 200 for expedited high-speed delivery of international mailpieces. First, a consumer fills out a customs declaration form 202, shown in FIG. 1. One copy of the completed customs declaration form 202b may be attached to the international mailpiece 204. Then, international mailpiece 204 with the attached copy of customs declaration form 202b may be deposited into the mail stream at, for example, a mailbox 206. Another copy of completed customs declaration form 202a may also be deposited into the mail stream at mailbox 206, separate from international mailpiece 204. After entering the mail stream, both international mailpiece 204 with the attached copy of customs declaration form 202b and the unattached copy of completed customs declaration form 202a may be forwarded for further processing to a processing and distribution center 212. Yet another separate copy of the completed customs declaration form 202d may be kept at a local post office 208. The consumer also may retain a fourth copy of the completed customs declaration form 202c.

After arriving at processing and distribution center 212, international mailpiece 204 with the attached copy of completed customs declaration customs form 202b is sent to its destination to another country via process 214. The unattached copy of completed customs declaration form 202a follows process 216.

To facilitate expedited review of the customs declaration information by the customs services of both the sending and destination countries, the service provider may create a digital file of the information listed on the front of the declaration customs form 202a, as discussed in detail below. Using mail processing equipment 230, a service provider may create a digital file, such as an electronic customs manifest, reflecting information depicted on the paper copy of customs declaration form 202a. One of skill in the art will recognize that mail processing equipment 230 may be any appropriate type of equipment capable of processing mail, such as for example, the Advanced Facer System/Input SubSystem (AFCS/ISS). A camera for taking an image of the customs declaration form may be any appropriate camera, for example, a digital or analog camera, capable of taking an image of the front of the customs declaration form. The service provider may install such cameras on its mail processing equipment as necessary to enable the camera to take such images.

If the software of mail processing equipment 230 can not convert information depicted on declaration customs form 202a into a digital file, the service provider may forward the image of customs declaration form 202a to a remote encoding center (REC) site 228. There, the service provider employee may read and manually process information that the software was unable to convert into a digital file. The service provider may also send a paper copy of declaration customs form 202a to storage 232 for future reference.

Once an electronic customs manifest is created, the service provider may forward that electronic customs manifest to a database 234 via a network for further forwarding to a domestic customs service 220 for review. Database 234 may be any appropriate type of database, and may use, for example, proprietary or commercially available software such as an Oracle database. The network may be any appropriate type of network, such as, for example, an internal network (intranet) or a public network (e.g. the internet). Additionally, the network may utilize any suitable type of network protocol.

Having the electronic customs manifest forwarded to domestic customs service 220 within hours after depositing the international mailpiece into the mail stream may decrease the delivery time of the international mailpiece. This may be achieved by providing the domestic customs service of the sending country with the customs declaration information before the corresponding international mailpiece arrives at the border for international shipping. In addition, the service provider may also forward customs declaration form 202a, in the form of an electronic customs manifest, to the customs service 226 of the destination country. By doing so, the service provider can enable the foreign or destination customs service 226 to review the customs declaration information in advance of the arrival of the international mailpiece 204.

In process 214, after the international mailpiece 204 with attached copy of completed customs declaration customs form 202b is separated from non-international mailpieces at processing and distribution center 212, it may be routed for further processing to an international service center 218. After processing international mailpiece 204 at international service center 218, the service provider may forward international mailpiece 204 to domestic customs service 220. By the time the international mailpiece arrives, the domestic customs service 220 may already have reviewed the corresponding customs declaration information contained in the digital file received via network from database 234 and identified mailpieces that should be retained in the sending country at holding facility 222 for additional screening.

More specifically, the domestic customs service may find matching unique identifiers on the international mailpiece and one of the customs manifests stored in the database. Upon finding a match, based on the results of the review of the corresponding electronic customs manifest, the domestic customs service 220 will determine how to process the international mailpiece. For example, the domestic customs service 220 may identify certain international mailpieces as prohibited from leaving the originating country. Upon identifying those international mailpieces, the domestic customs service may return them to the sender or may hold for additional processing. Alternatively, the domestic customs service 220 may have determined, based on the corresponding electronic customs manifest, that the international mailpiece is free to leave the country without further handling or inspection.

To facilitate high-speed shipping of international mailpieces that do not require additional handling or inspection, domestic customs service 220 may forward those international mailpieces for loading onto airplane 224 departing to the destination country. Domestic customs service 220 may also retain international mailpieces requiring special handling by sending them to a holding facility 222 for subsequent individualized inspection. At holding facility 222, after the international mailpieces are inspected individually, the domestic customs service 220 can decide on a case-by-case basis where to forward each inspected international mailpiece. For example, the domestic customs service may send some of the international mailpieces for loading into the airplane 224 while returning others to the senders.

Figure 3:
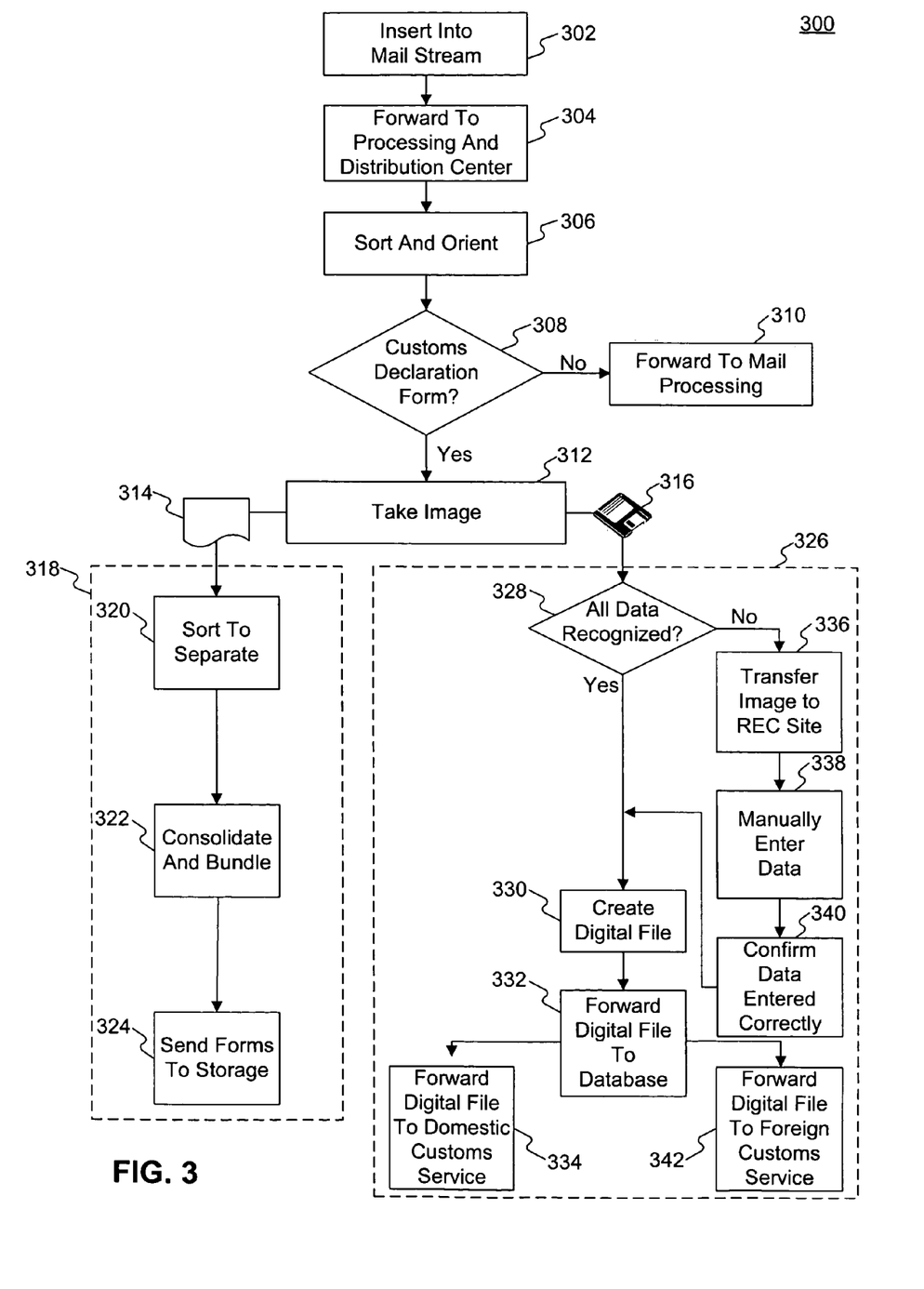
FIG. 3 is a flowchart of an exemplary process for processing a customs declaration form including creating and transferring an electronic customs manifest, consistent with the invention.

FIG. 3 is a flowchart of an exemplary process for processing a customs declaration form including creating and transferring an electronic customs manifest. After a consumer fills out a customs declaration form at step 302, one copy 202a (FIG. 2) may be inserted into the mail stream at, for example, mailbox 206. At step 304, the service provider may then forward the customs declaration form 202a to processing and distribution center 212 for processing. That may be possible because, as described above, customs declaration form 202a may have the form and shape of a regular letter. After customs declaration form 202a arrives at processing and distribution center 212, the service provider may prepare all received letters for processing by mail processing equipment 230. At step 306 the service provider may prepare for processing letters and customs declaration forms received at processing and distribution center 212 by sorting and orienting them in a certain way. For example, the service provider may group all letters of the same size together while keeping them oriented so that lettering on their faces is upside down.

After mail processing equipment 230 receives letters and customs declaration forms, at step 308 it may scan a unique identifier of each individual mailpiece to determine whether the mailpiece is a customs declaration form. If the mail processing equipment 230 determines that the mailpiece is a customs declaration form, at step 312 a mail processing equipment optical device may take an image of the front cover of the customs declaration form. If at step 308 the mail processing equipment 230 determines that the mailpiece is not a customs declaration form, then at step 310 the mail processing equipment forwards the mailpiece for further processing.

The image taken at step 312 by the mail processing equipment 230 may depict all the declaration information provided in the customs declaration form prepared by the sender of the international mailpiece 204 (FIG. 2). Once the image is created, software, such as, for example, Parascript, may convert handwritten or typed data depicted on the image into a digital file 316. As a person skilled in the art will recognize, to convert the image into a digital file, the service provider may use any appropriate software, such as intelligent character recognition (ICR) software capable of recognizing handwriting and converting such data into a digital file. Then, newly created digital file 316 may follow process 326 while a paper copy of customs declaration form 314 that was used for creating that digital file may follow process 318.

To insure the quality of the digital file 316, at step 328 the service provider may confirm whether all the data depicted on the image taken by mail processing equipment 230 was correctly recognized and converted by the software into the digital file 316. The service provider may perform this confirmation using any appropriate commercially available software. If all the data was properly recognized, the service provider may create a digital file, thus creating an electronic customs manifest at step 330.

If not all the data depicted on the customs declaration form was recognized by the software extracting data from the image, at step 336 the service provider may electronically forward the image of the customs declaration form via a network to REC site 228 (FIG. 2). Upon receipt of the image, personnel at REC site 228 may visually examine the image of the customs declaration form and at step 338 manually enter all customs declaration form related information, including identifiers in a unique identifier uniquely identifying the international mailpiece, into a database 234 (FIG. 2). To reduce inevitable errors associated with manual data entry of customs declaration related information, the service provider may at step 340 have its employees confirm the correctness of entered information prior to forwarding the electronic entry to database 234. Once confirmation is completed, all the data depicted on the customs declaration form may be converted into a digital file, an electronic customs manifest at step 330.

After the electronic customs manifest is created at step 330, the service provider may at step 332 forward it to database 234 (FIG. 2). Once database 234 receives the electronic customs manifest in the form of a digital file, at steps 334 and 342 it may be further forwarded via a network to both domestic and foreign customs services, respectively, as discussed above.

At step 320, the service provider may sort paper copies of customs declaration forms to separate them from the rest of non-customs declaration form mailpieces. After that separation is completed, the service provider may consolidate and bundle customs declaration forms at step 332 and then at step 324 forward them to storage 232 (FIG. 2) for archiving.

Figure 4:
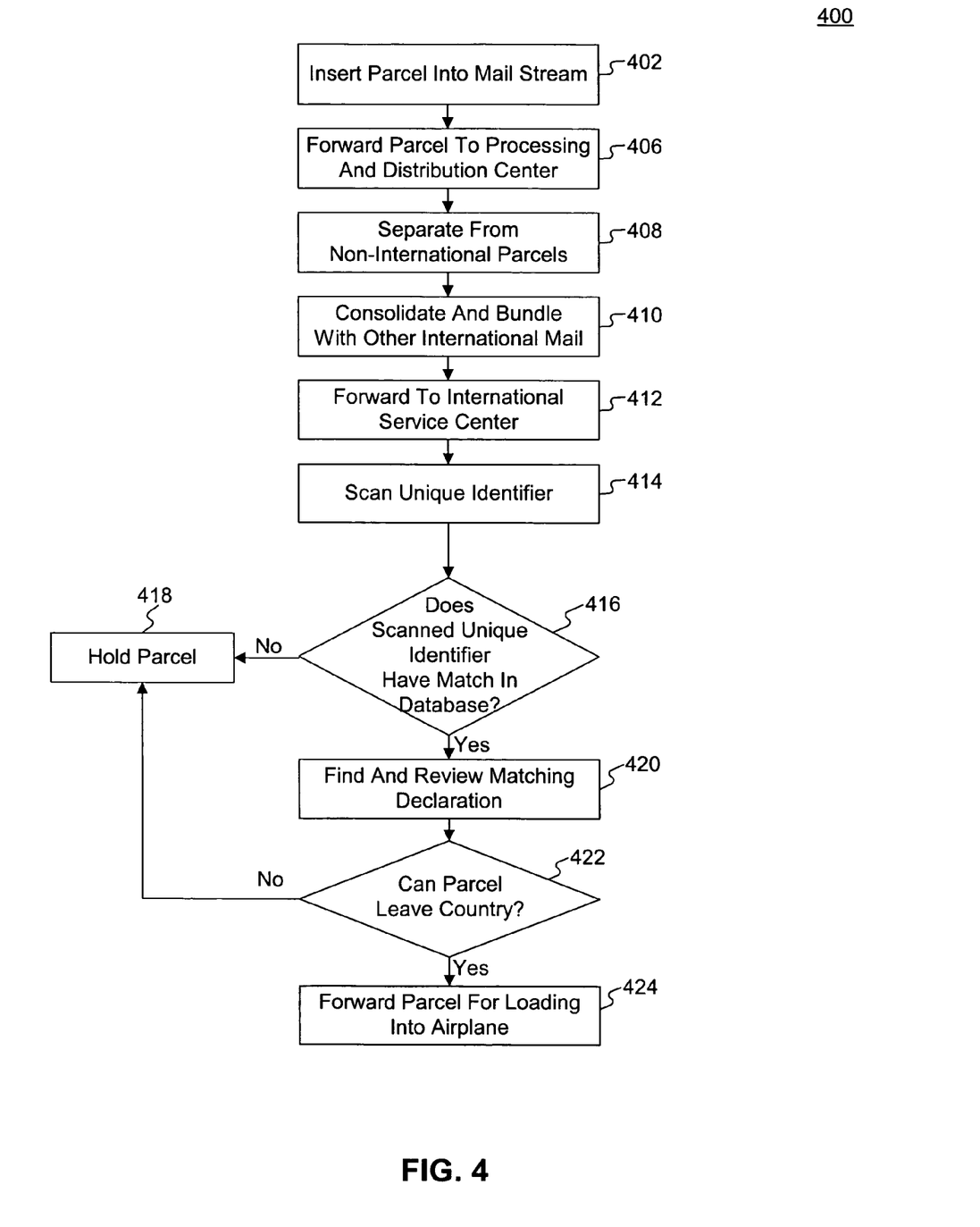
FIG. 4 is a flowchart of an exemplary process for processing an international mailpiece having a customs declaration form attached to it, consistent with the invention.

FIG. 4 is a flowchart of an exemplary process for processing an international mailpiece having a customs declaration form attached to it. After an international mailpiece 204 (FIG. 2), such as a parcel, is inserted into the mail stream (at step 402), the service provider may at step 406 forward the parcel to the processing and distribution center 212, shown in FIG. 2. After the parcel arrives at the processing and distribution center 212, the service provider may separate it from all others mailpieces with domestic destinations at step 408. After the separation, the service provider may consolidate and bundle all international mailpieces (step 410) for further forwarding at step 412 to international service center 218, shown in FIG. 2.

After the international mailpiece arrives at international service center 218, the service provider may scan the unique identifier of the customs declaration form attached to the international mailpiece 204 at step 414. The information in the scanned unique identifier may then be forwarded to database 234 (FIG. 2) to find a matching unique identifier of an electronic customs manifest in step 416. If a matching unique identifier is found, an employee of domestic customs service 220 reviews the corresponding electronic customs manifest at step 420 to confirm that the international mailpiece is permitted to leave the originating country at step 422. If a matching unique identifier is not found in database 234 (FIG. 2), at step 416 the service provider may at step 418 send the international mailpiece to holding facility 222 for further evaluation.

If the employee of domestic customs service 220 determines that an international mailpiece may leave the originating country, the service provider may at step 424 assemble that international mailpiece with other international mailpieces allowed to leave the originating country for subsequent loading into an airplane 224. The service provider may then deliver the international mailpieces to the airport for loading into the airplane 224. If the employee of domestic customs service 220 determines that the international mailpiece may not leave the originating country, the service provider may forward that international mailpiece to holding facility 222 for further evaluation.

In an alternative embodiment, the service provider may perform an additional automated final check and match of international mailpieces with their corresponding electronic custom manifests at the time of loading airplane 224. When international mailpieces arrive at an airplane loading site, the unique identifiers of customs declaration customs forms attached to each international mailpiece may be scanned to confirm that there is permission for the mailpiece to leave the originating country. If it is determined that an international mailpiece may not leave the originating country, the international mailpiece will not be loaded onto the airplane and will instead be forwarded to the mailpiece to holding facility 222 (FIG. 2).

Additionally, in an alternative embodiment, upon unique identifier scanning of international mailpieces being loaded into an airplane, the service provider may forward electronic customs manifests of the international mailpieces to foreign customs service 226. Doing so may provide, for example, an alert to the foreign customs service 226 that certain international mailpieces will be arriving within predetermined period of time, defined by the duration of an airplane flight, and will allow the foreign customs service 226 to perform advanced review of the electronic customs manifests. This may speed delivery in the destination country.

In yet another embodiment, before scanning unique identifiers and finding matches in the database, the domestic customs service 220 may identify and electronically tag all electronic customs manifests whose corresponding international mailpieces require additional inspection or are prohibited from leaving the originating country. These tagged electronic manifests then may be downloaded to scanner devices used by service provider employees. As a result, when the service provider employee scans a unique identifier of the customs declaration form attached to the international mailpiece having corresponding electronic customs manifest that has been tagged, the scanner device may generate a distinct sound. Upon hearing the distinct sound, the employee then will separate the international mailpiece in question for forwarding to domestic custom service 220 for inspection.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of making a decision whether to allow an international mailpiece to leave an originating country, comprising:
   creating, via a processor, a digital file containing data of a customs declaration form having a unique identifier, wherein the digital file includes the unique identifier and a tag indicative of whether the internationally addressed item requires further examination before leaving the originating country, wherein the digital file is an electronic customs manifest;
   storing the electronic customs manifest in a database;
   receiving data representing the unique identifier from a scanner device that scans the customs declaration form, wherein the scanner device is operatively coupled to the database;
   in response to receiving the data, finding in the database, via the processor, a match between the unique identifier scanned from the customs declaration form and the unique identifier contained in the electronic customs manifest stored in the database;
   returning to the scanner device, an indication of whether further examination is required, the indication being based on the tag contained in the electronic custom manifest;
   in instances where the indicator indicates further examination is required, emitting a distinct alert from the scanner device that serves only the purpose of alerting a user of a need for further inspection; and
   permitting the international mailpiece having a matching unique identifier to leave the originating country based on finding the match when the indicator does not indicate further examination is required.

2. The method of claim 1, wherein creating further comprises creating an image of the customs declaration form.

3. The method of claim 2, wherein creating further comprises converting the image into an electronic customs manifest.

4. The method of claim 1, wherein the unique identifier is a barcode.

5. The method of claim 4, wherein the barcode includes a code of the originating country.

6. The method of claim 4, wherein the barcode includes a unique number distinguishing each customs declaration form from all other customs declaration forms.

7. The method of claim 1, further comprising forwarding a paper copy of the customs declaration form to a storage.

8. A computer-implemented method of making a decision whether to allow an internationally addressed item to leave an originating country, comprising:
   creating, via a processor, a digital file containing data of a customs declaration form having a unique identifier, wherein the digital file includes the unique identifier and a tag indicative of whether the internationally addressed item requires further examination before leaving the originating country, wherein the digital file is an electronic customs manifest;

storing the electronic customs manifest in a database;

receiving data representing the unique identifier from a scanner device that scans the customs declaration form, wherein the scanner device is operatively coupled to the database;

in response to receiving the data, finding in the database, via the processor, a match between the unique identifier scanned from the customs declaration form and the unique identifier contained in the electronic customs manifest stored in the database;

returning to the scanner device, an indication of whether further examination is required, the indication being based on the tag contained in the electronic custom manifest;

in instances where the indicator indicates further examination is required, emitting a distinct alert from the scanner device that serves only the purpose of alerting a user of a need for further inspection; and returning the internationally addressed item to a sender if a domestic customs service does not allow the internationally addressed item to leave the originating country.

9. The method of claim 8, wherein creating further comprises creating an image of the customs declaration form.

10. The method of claim 9, wherein creating further comprises converting the image of the customs declaration form into an electronic customs manifest.

11. The method of claim 8, wherein the unique identifier is a barcode.

12. The method of claim 11, wherein the barcode includes a code of the originating country.

13. The method of claim 11, wherein the barcode includes a unique number distinguishing each customs declaration form from all other customs declaration forms.

14. The method of claim 8, further comprising forwarding a paper copy of the customs declaration form to a storage.

15. A computer-implemented method of making a decision whether to allow an internationally addressed item to leave an originating country, comprising:

creating, via a processor, a digital file containing data of a customs declaration form having a unique identifier, wherein the digital file includes the unique identifier and a tag indicative of whether the internationally addressed item requires further examination before leaving the originating country, wherein the digital file is an electronic customs manifest;

storing the electronic customs manifest in a database;

receiving data representing the unique identifier from a scanner device that scans the customs declaration form, wherein the scanner device is operatively coupled to the database;

in response to receiving the data, finding in the database, via the processor, a match between the unique identifier scanned from the customs declaration form and the unique identifier of the electronic customs manifest stored in the database;

returning to the scanner device, an indication of whether further examination is required, the indication being based on the tag of the electronic custom manifest associated with the identifier;

in instances where the indicator indicates further examination is required, emitting a distinct alert from the scanner device that serves only the purpose of alerting a user of a need for further inspection; and permitting the internationally address item having a matching unique identifier to leave the originating country based at least in part on the result of finding a match when the indicator does not indicate further examination is required.

16. The method of claim 15, wherein creating further comprises creating an image of the customs declaration form.

17. The method of claim 15, wherein creating further comprises:

converting the image into an electronic customs manifest; and transmitting the electronic customs manifest for storage in the database.

18. The method of claim 15, wherein the unique identifier is a barcode.

19. The method of claim 18, wherein the barcode includes a code corresponding to the originating country.

20. The method of claim 18, wherein the barcode includes a unique number distinguishing each customs declaration form from all other customs declaration forms.

21. The method of claim 15, further comprising forwarding a paper copy of the customs declaration form to a storage.

22. A method of making a decision whether to allow an internationally addressed item to leave an originating country, comprising:

creating, via a processor, a digital file containing data of a customs declaration form attached to the internationally addressed item, wherein the digital file includes a unique identifier and a tag indicative of whether the internationally addressed item requires further examination before leaving the originating country;

storing the digital file in a database;

receiving data representing the unique identifier from a scanner device that scans the customs declaration form, wherein the scanner device is operatively coupled to the database;

in response to receiving the data, finding in the database, via the processor, a match between a unique identifier scanned from the customs declaration form and the identifier of the digital file stored in a database;

returning to the scanner device, from the database, an indication, based on the tag of the digital file associated with the identifier, of whether further examination is required;

in instances where the indicator indicates further examination is required, emitting a distinct alert from the scanner device that serves only the purpose of alerting a user of a need for further inspection; and returning the internationally addressed item to the sender if the domestic customs service does not allow the internationally addressed item to leave the originating country.

23. The method of claim 22, wherein creating further comprises creating an image of the customs declaration form.

24. The method of claim 22, wherein creating further comprises converting the image into an electronic customs manifest included in the digital file.

25. The method of claim 22, wherein the unique identifier is a barcode.

26. The method of claim 25, wherein the barcode includes a code of the originating country.

27. The method of claim 25, wherein the barcode includes a unique number distinguishing each customs declaration form from all other customs declaration forms.

28. The method of claim 22, further comprising forwarding a paper copy of the customs declaration form to a storage.

* * * * *

UNITED STATES PATENT AND TRADEMARK OFFICE
Certificate

Patent No. 7,818,266 B2                                    Patented: October 19, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Louie F. Pento, Staten Island, NY (US); Daniel S. Stirewalt, Brooklyn, NY (US); Robert L. Otto, Stafford, VA (US); and John T. Edgar, Alexandria, VA (US).

Signed and Sealed this Eleventh Day of October 2011.

*JOHN HAYES*
*Supervisory Patent Examiner*
*Art Unit 3628*
*Technology Center 3600*